Patented Feb. 17, 1931

1,793,350

UNITED STATES PATENT OFFICE

WALTER BADER AND STANLEY JOSEPH GREEN, OF SPONDON, NEAR DERBY, ENGLAND, ASSIGNORS TO CELANESE CORPORATION OF AMERICA, A CORPORATION OF DELAWARE

PROCESS FOR THE MANUFACTURE OF ZINC-OXIDE CATALYSTS

No Drawing. Application filed September 15, 1927, Serial No. 219,804, and in Great Britain May 2, 1927.

This invention relates to the manufacture of methyl alcohol and to catalysts for use therein.

It is known that methyl alcohol can be prepared from gas mixtures containing hydrogen and an oxide or oxides of carbon by leading them over catalysts, under pressure and at a temperature between about 250 and 450° C. A very large number of substances have been proposed as catalysts for this reaction, but it is generally known that only zinc oxide, or mixtures containing zinc oxide are economically successful.

As a rule zinc oxide forms the bulk of the catalyzing mixture, its action being enhanced by relatively small amounts of so-called promoters. For this purpose, oxides of chromium are generally favoured, and also small amounts of copper.

It has now been found that the physical condition of the zinc oxide, which depends upon the method of its preparation, is much more important for its activity than the presence of promoters. A zinc oxide, which by itself is only moderately active, certainly becomes activated by the addition of 5-10% of chromic acid, but the effect of the same promoter upon a zinc oxide which is already highly active, is quite small.

Pure zinc oxide can be relatively inactive as a catalyst for the formation of methyl alcohol, and it may show every possible degree of activity, without any apparent chemical reason.

The present invention makes possible the preparation of a highly active pure oxide catalyst which does not require the presence of any promoter, its activity being in fact hardly influenced by a promoter. The use of a chemically pure substance as a catalyst has the advantage that undesirable by-reactions are thereby minimized.

According to the present invention, a highly active form of zinc oxide is prepared by heating a zinc carbonate gel to a temperature not higher than that used in the catalytic preparation of methyl alcohol, and the zinc oxide so prepared is used as catalyst in the synthetic production of methyl alcohol from mixtures containing hydrogen and oxides of carbon.

The temperatures used for converting the zinc carbonate gel into zinc oxide lie between about 250° C. and 450° C., and preferably between about 250° C. and 350° or 400° C.

The type of zinc carbonate gel employed is of considerable importance. The more colloidal and gelatinous it is, the greater is the catalytic activity of the zinc oxide finally obtained. Zinc carbonate gels of this kind can be obtained by precipitation in very dilute solutions at ordinary or low temperature. They should not be brought to a denser state by filtering or pressing, but, after washing by decantation, the water should be removed by drying. The complete removal of electrolytes from the precipitate is important for the production of zinc oxide catalyst of high activity. In order to increase the voluminous character of the product, the drying of the zinc carbonate gel may be effected by heating under vacuum or reduced pressure.

It is preferred to precipitate the zinc carbonate in the presence of solutions or jellies containing suitably inert protective colloids, e. g. starch, pectin, saponin, silica, etc., or to mix the precipitate, after washing, with solutions or jellies of such bodies. This not only enhances the activity of the zinc oxide finally obtained, but also facilitates the formation of the dried mass into convenient granules. In this case also, the product may be dried by heating under vacuum.

The following example shows one of the many ways in which the invention can be carried out.

Example

A 1% solution of zinc nitrate is poured, at room temperature, into an equivalent solution of sodium carbonate, also of 1% strength, with good agitation. The gelatinous precipitate is thoroughly washed with water by decantation, then mixed with a starch jelly and dried at about 60° C. The dry mass is broken into pieces of about ¼ inch size and charged into the reaction chamber used in the synthesis of methyl alcohol. At the prevailing temperature, e. g. 250° to 300° C., the zinc carbonate gel is converted into a light, fluffy form or zinc oxide displaying a high degree of activity when used as catalyst in the production of methyl alcohol by the hydrogenation of oxides of carbon.

Dilute solutions of any other soluble zinc salt (e. g. zinc sulphate or chloride), or of a sodium bi-carbonate or any other soluble carbonate or bicarbonate (e. g. potassium or ammonium carbonate or bicarbonate) may be substituted for the zinc nitrate and sodium carbonate in the production of the zinc carbonate gel.

The proportions and concentrations of the reagents may be varied as desired always provided that a zinc carbonate gel of a sufficiently voluminous character is obtained as the result of the reaction.

The zinc carbonate gel may be mixed with solutions or jellies of any suitably inert protective colloids such as starch, pectin, saponin, or silica, or may be formed in the presence of such solutions or jellies, or it may be prepared and converted into zinc oxide catalyst in the entire absence of such colloids.

As previously explained, it is convenient to effect the conversion of the zinc carbonate gel into zinc oxide during the synthesis of the methyl alcohol. For example, the zinc carbonate gel may be placed in a suitable reaction chamber maintained at a temperature of 250 to 340° C., for example 300° C., through which a mixture containing approximately two parts by volume of hydrogen and one part by volume of carbon monoxide is passed under a pressure of about 80 to 120 atmospheres. As the conversion of the zinc carbonate gel into zinc oxide proceeds, methyl alcohol is produced in quantities which rapidly increase to a maximum.

The conversion of zinc carbonate gel into zinc oxide may however be effected as an entirely separate operation under conditions similar to or differing from those obtaining in the methyl alcohol synthesis. Thus, for instance, a zinc oxide may be produced from a zinc carbonate gel at low temperature under atmospheric pressure, and used afterwards in the production of methyl alcohol at a higher temperature.

The zinc oxide prepared in accordance with the process forming the subject matter of the present invention may also be employed in admixture with a promoter, or mixed with other catalysts suitable for combining hydrogen with oxides of carbon, or mixed with or distributed over an inert solid carrier, such as pumice or carbon. Such mixtures or preparations may be formed after the conversion of the zinc carbonate gel into zinc oxide, or, in suitable cases, by mixing the added substance with the zinc carbonate gel before or after the drying operation, or by incorporating the added body with the zinc carbonate gel during its formation. In some cases, it is possible to form a suitable mixture by co-precipitation from a solution containing a mixture of salts or compounds. For instance, a zinc oxide containing chromium oxide as promoter can be obtained by precipitating the zinc carbonate gel from a solution containing a zinc salt and a chromium salt, and drying and heating the resulting gelatinous precipitate in the manner previously described.

What we claim and desire to secure by Letters Patent is:

1. A process for the manufacture of a zinc oxide catalyst for use in the synthesis of methyl alcohol from mixtures of hydrogen and oxides of carbon, which comprises heating a zinc carbonate gel at a temperature not exceeding the temperature at which the catalyst is to be employed in the synthesis of methyl alcohol.

2. A process according to claim 1, which comprises precipitating the zinc carbonate gel in very dilute solution.

3. A process according to claim 1, which comprises incorporating a solution or jelly of a protective colloid with the zinc carbonate gel.

4. A process according to claim 1, which comprises precipitating the zinc carbonate gel in the presence of a solution or jelly of a protective colloid.

5. A process according to claim 1, wherein the zinc carbonate gel is converted into zinc oxide catalyst at a temperature not exceeding 450° C.

6. A process according to claim 1, wherein the zinc carbonate gel is converted into zinc oxide catalyst at a temperature between about 250° C. and 350° C.

7. A process according to claim 1, wherein the zinc carbonate gel, while incorporated with a solution or jelly of a protective colloid, is converted into a zinc oxide catalyst at a temperature between about 250° C. and 400° C.

8. A catalyst for use in the synthesis of methyl alcohol, comprising a zinc oxide having a gel structure.

9. A zinc oxide catalyst prepared by heating a zinc carbonate gel at a temperature between about 250° C. and 450° C.

10. A zinc oxide catalyst prepared by heating a composition comprising a zinc carbonate gel and a protective colloid at a temperature between about 250° C. and 450° C.

In testimony whereof we have hereunto subscribed our names.

WALTER BADER.
STANLEY JOSEPH GREEN.